United States Patent

[11] 3,559,894

[72] Inventors Gregory J. Murray;
 Frederick K. Tarrant, Sr., Saratoga Springs, N.Y.
[21] Appl. No. 776,321
[22] Filed Nov. 18, 1968
[45] Patented Feb. 2, 1971
[73] Assignee Tarrant Manufacturing Company
 a corporation of New York

[54] MATERIAL-SPREADING APPARATUS WITH INTERCHANGEABLE MATERIAL CONVEYOR ASSEMBLIES
 11 Claims, 7 Drawing Figs.
[52] U.S. Cl. .............................................. 239/672,
 239/675, 239/676, 239/681, 239/687
[51] Int. Cl. .................................................. A01c 19/00
[50] Field of Search .......................................... 239/672,
 675, 676, 681, 687

[56] References Cited
UNITED STATES PATENTS

| | | | |
|---|---|---|---|
| 635,836 | 10/1899 | Ziegenhorn et al. | 239/676X |
| 1,880,155 | 9/1932 | Ruth | 239/676X |
| 1,919,619 | 7/1933 | Dean | 239/687 |
| 1,938,669 | 12/1933 | Smith | 239/675 |
| 2,517,151 | 8/1950 | Weston | 239/672X |
| 2,965,379 | 12/1960 | Ganley | 239/687X |
| 3,322,429 | 5/1967 | Carvelli | 239/675X |
| 3,329,436 | 7/1967 | Fyrk | 239/672 |
| 3,438,585 | 4/1969 | Buchmann | 239/676X |

Primary Examiner—Lloyd L. King
Attorney—Paul A. Frank

ABSTRACT: A material-spreading apparatus has a hopper consisting of a V-shaped upper section and a rectangular lower section having an opening at the bottom of its rear wall with guides in the bottom section so that a desired type of a plurality of material-conveying assemblies may be slid into or removed from the bottom section. A discharge chute at the end of a material-conveying assembly includes a spinner mechanism and a plurality of internal deflectors to permit use with different types of conveyor assemblies. A palletized power unit for driving both the conveyor assembly and the spinner is attached to the rear wall of the hopper and is removable to facilitate maintenance.

PATENTED FEB 2 1971

Inventors
Gregory J. Murray
Frederick K. Tarrant Sr.,
by Paul G. Franks
Their Attorney Inventors
Gregory J. Murray
Frederick K. Tarrant, Sr.,
by Paul L. Frank
Their Attorney

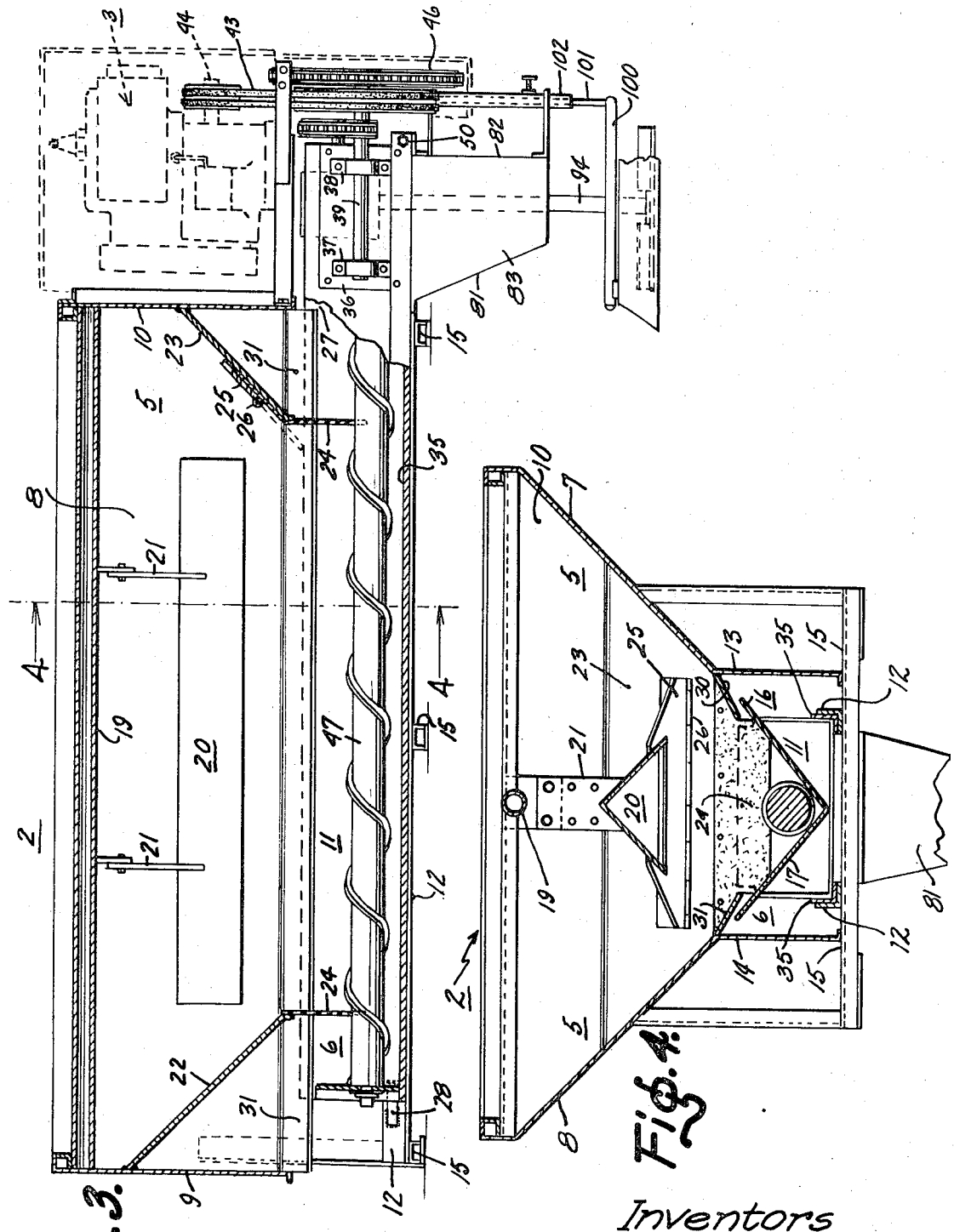

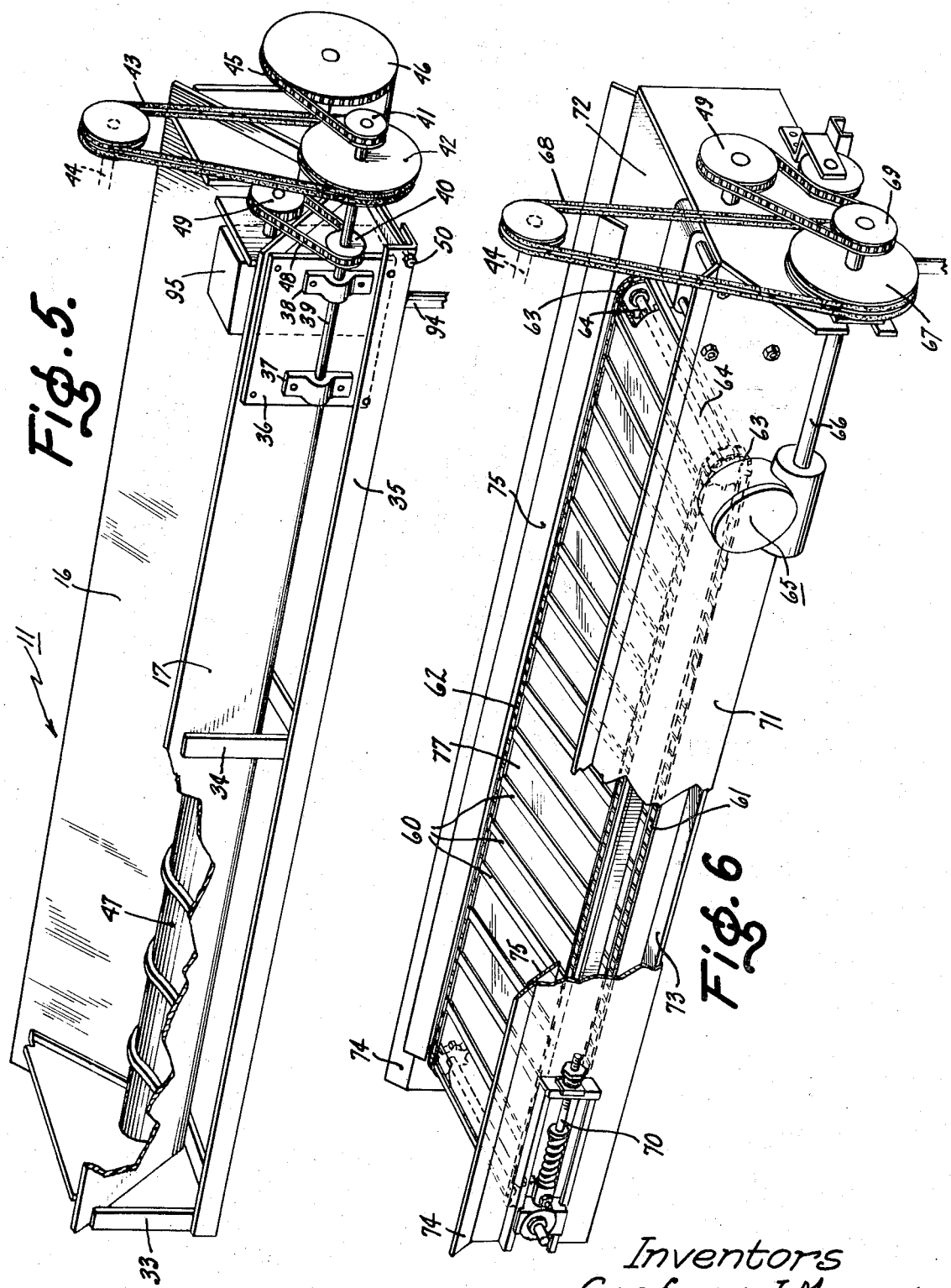

MATERIAL-SPREADING APPARATUS WITH INTERCHANGEABLE MATERIAL CONVEYOR ASSEMBLIES

Our invention relates to material-spreading apparatus and in particular to apparatus for spreading materials such as salt, sand, cinders, and the like, on roads.

It has been found that different types of spreading apparatus are needed for handling the various types of materials which are used in road maintenance in inclement weather. Thus, an auger-type spreader is ideal for handling deicing chemicals, such as rock salt, but is not satisfactory for handling other abrasive or chemical-abrasive types of material, such as sand, cinders, and the like. It has been long recognized that a drag-bar-type of conveyor is more satisfactory for handling these and other types of materials.

One problem encountered by users of material spreading apparatus of this type is that, because the material-conveying apparatus is integral with the hopper which receives the material to be spread, whenever an injury occurs to the conveyor or the spinner which receives material from the conveyor and distributes it on the road, the complete apparatus is out of use until the conveyor system can be repaired. It is well known that in using such apparatus, the conveyor system and the spinners for spreading the material are easily injured, for example when the spinner of the spreader hits a roadbank, a sandpile, or a rock or the conveyor encounters a rock or piece of metal in the material to be spread. Another problem encountered by users of this type of apparatus is that the life of the complete apparatus is determined by the life of the most vulnerable portion of the apparatus, that is, the conveyor and spinner assembly. While the hopper for receiving the material to be spread may still be in good condition, the conveying apparatus itself usually is at a point where, because of rust or injury, repair is not economically feasible. As a consequence, the entire apparatus must be scrapped and replaced.

It is a principal object of our invention to provide a new and improved material-spreading apparatus constructed and arranged to permit the use of any of a plurality of material conveyors in the apparatus and to facilitate changing of the conveyors in accordance with the material to be spread.

It is another object of our invention to provide a unitary conveyor assembly for use in a material-spreading apparatus which may be easily inserted in or removed from a hopper of the apparatus.

It is another object of our invention to provide a new and improved discharge chute and spinner assembly for a material-spreading apparatus which is usable with any of a plurality of types of material conveyors.

It is another object of our invention to provide new and improved material-spreading apparatus with removable conveyor assemblies which may be easily and quickly removed for repair and maintenance.

In its broadest aspect, our invention consists in a material-spreading apparatus having a hopper designed with upper and lower sections, the lower section being adapted to receive any of a plurality of types of conveyor systems which may be quickly and easily removed or inserted in accordance with the type of material to be spread. A unitary conveyor assembly is removably positioned in guides provided in the lower section and includes a discharge chute with a spinner mechanism, the chute having an arrangement of deflectors whose position may be changed in accordance with the material to be spread to provide a desired spread pattern. Another feature of our invention consists in employing a palletized, cartridge-type power unit to provide drive power for the conveyor assembly and the spinner, the palletized unit being attached to the rear wall of the hopper and easily removed from its assembled position to facilitate ease in maintenance.

The novel features which are believed to be characteristic of our invention are set forth in the appended claims. The invention, itself, however, with further objects and advantages thereof may best be understood by reference to the following description taken in conjunction with the accompanying drawings in which:

FIG. 3 is a vertical sectional view taken along line 3-3 of FIG. 2;

FIG. 4 is a vertical elevation view taken along the line 4-4 of FIG. 3;

FIG. 5 is a perspective view, partly in section, of a unitary material conveyor assembly of our invention employing an auger-type conveyor;

FIG. 6 is a perspective view, partly in section, of a unitary conveyor assembly of our invention employing a drag-link-type conveyor.

Figure 1:
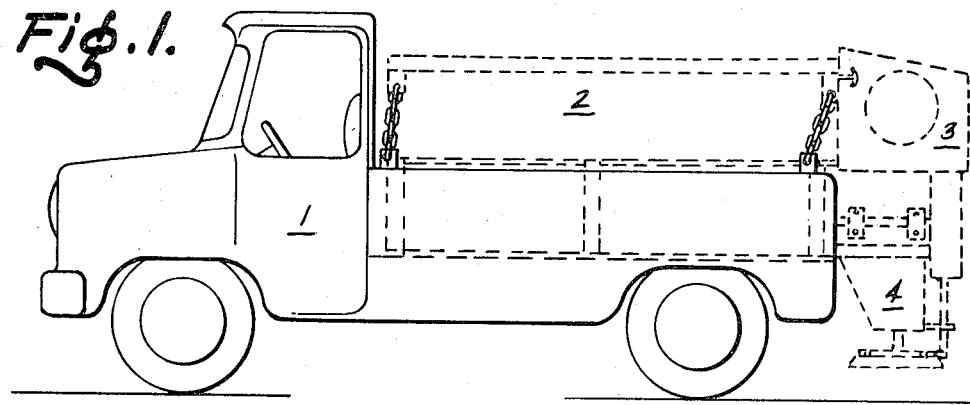
FIG. 1 illustrates the material-spreading apparatus of our invention in position on a pickup-type truck.

Our material-spreading apparatus is shown in FIG. 1 as being carried on the body of a pickup truck 1, the spreader apparatus comprising a hopper 2, a palletized power unit 3, and a chute and spinner assembly 4. While the apparatus is shown on a pickup-type truck, the entire hopper assembly is so constructed that it is equally usable on its own towed trailer or any other equivalent vehicle.

Figure 2:
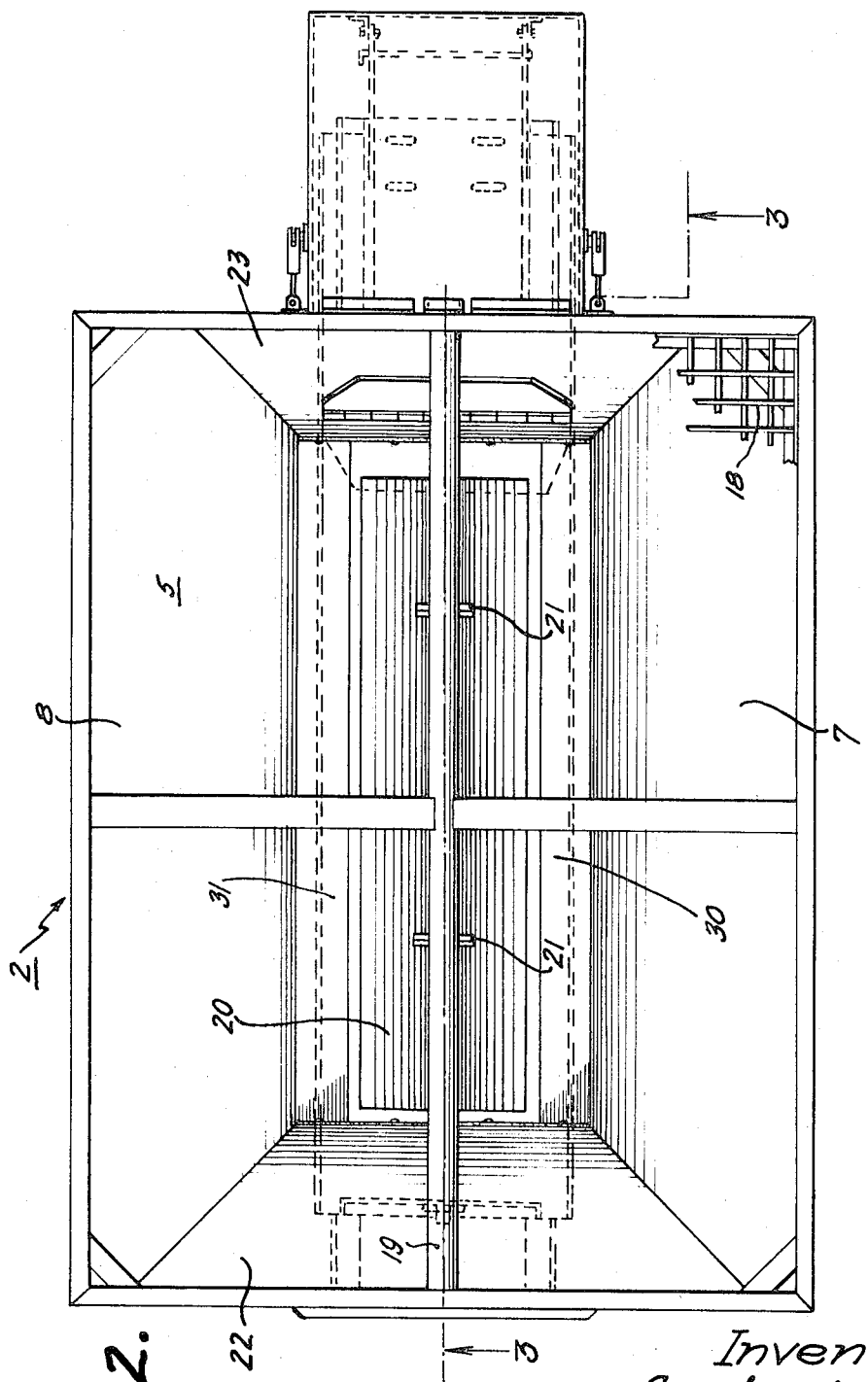
FIG. 2 is a plan view of one form of our material-spreading apparatus.

The embodiment of our material-spreading apparatus shown in FIGS. 2—4 employs a hopper 2 having a V-shaped upper section 5 and a rectangular lower section 6. The upper section 5 is formed by converging sidewalls 7, 8 and end walls 9, 10 end wall 10 having an opening 27 in its lower portion. The lower rectangular section 6 in accordance with our invention is constructed and arranged to receive a removable conveyor assembly 11 which in the form of the apparatus shown in FIGS. 2—4 comprises a conveyor of the auger type. In order to facilitate the insertion and removal of the conveyor assembly 11 through the opening in the lower end of wall 10, we provide a pair of guides 12 attached to the bottom of rectangular section 6 to receive the conveyor assembly and upon which the assembly may be slid until it engages a stop 28. When the conveyor assembly has thus been automatically located in the correct operating position, it is locked in this position by means of a locking rod 50 which is inserted in holes provided in guides 12 and rails 35 of the conveyor assembly. While in FIG. 4 the guides 12 are illustrated as comprising a pair of angle irons, any other suitable guides, with or without bearings to facilitate installation and removal of the conveyor assembly, may be employed. In forming rectangular section 6, we employ a pair of sidewalls 13, 14 which are welded to converging sidewalls 7, 8 respectively and to the floor or base member 15 of the hopper. Sidewalls 13, 14 extend longitudinally of hopper 5 and are in spaced relation with sidewalls 16, 17 of conveyor assembly 11.

The hopper construction may include a one-piece screen 18 at the top of hopper 2, which can be easily installed or removed and functions to prevent rocks, lumps, or foreign material from clogging, jamming, or damaging the conveyor and spreading apparatus. In order to relieve the weight of material in the hopper from pressing too heavily upon the conveyor assembly, we provide a baffle arrangement comprising rod 19 which extends between end walls 9, 10 and supports an inverted V-shaped baffle 20 adjustable vertically by means of a pair of hangers 21 bolted to rod 19. When desired, baffle 20 may be removed from the hopper by detaching the hangers from rod 19. Attached to vertical end walls 9, 10 to form hopper 2 are two inwardly converging members 22, 23 which join with converging walls 7, 8 to direct the flow of materials to be spread to the conveyor assembly 11. Flexible deflectors 24 which may comprise pieces of rubber belting are attached to the bottoms of walls 22 and 23 to assist in confining material in the hopper to the conveyor assembly 11 and prevent it from spilling over into the end bearings of the conveyor. A material flow restrictor 25 is attached to converging portion 23 of the rear wall by means of a hinge 26 and is movable between the fully open position as shown to a fully closed position (shown in dotted lines) to provide means for controlling the rate at which material is supplied to the conveyor assembly 11.

Attached to the lower ends of the respective converging sidewalls 7, 8 are a pair of baffles 30, 31 which inhibit or prevent material to be spread from falling into the space between walls 13, 16 and 14, 17. For this purpose, baffles 30, 31 are constructed to extend into the trough or region between sidewalls 16, 17 of the conveyor assembly The unitary material conveyor assembly illustrated in FIG. 5 employs an auger-type conveyor This unitary assembly includes not only the converging sidewalls 16, 17, but supporting bars 33, 34 and a bearing plate 36 joined together by angles or rails 35. Plate 36 supports a pair of bearings 37, 38 in which are journaled a jack-shaft 39 which in turn carries sprockets 40, 41, and pulley 42. Pulley 42 is connected through a V-belt 43 to a pulley on the output shaft 44 of a power unit. Sprocket 41 is connected by means of a chain 45 to a sprocket 46 mounted on the drive shaft of auger conveyor 47. Sprocket 40 is connected through a chain 48 to a sprocket 49 to provide driving power for a spinner mechanism to be described later. As mentioned previously, the entire conveyor assembly of FIG. 5 is constructed as a unitary structure which can be slid into guides 12 in the lower section 6 of FIG. 4 and locked into position by means of a locking rod 50 which extends through holes provided in guides 12 and rails 35.

FIG. 6 illustrates a drag-bar-type of conveyor comprising a plurality of spaced crosslinks 60 connected at their opposite ends to conveyor chains 61, 62. The links of chains 61, 62 engage drive sprockets 63 carried on a shaft 64 driven through a gear arrangement 65 and a drive shaft 66. Shaft 66 carries a pulley 67 connected by means of V-belt 68 to a pulley on output shaft 44 of the power unit. Shaft 66 also carries a sprocket 69 which is connected to driving sprocket 49 of the spinner assembly. A conventional takeup means to maintain tension in chain 61, 62 and the drag link conveyor is provided by means of a spring and adjustable bolt arrangement 70.

In constructing the unitary conveyor assembly of FIG. 6, we provide a pair of sidewalls 71, 72 and longitudinally extending bars or rails 73 which permit sliding the unitary assembly into the guides 12 provided in the lower section 6 of the hopper assembly. The upper ends of sidewalls 71, 72 are formed as baffles 74 and extend under baffles 30, 31 of hopper 2 when the conveyor assembly is slid into lower section 6. Chain covers 75 are welded to the sidewalls to prevent material in the hopper assembly from clogging or interfering with the free running of the chain drive. A wear plate 77 positioned between the upper and lower levels of crosslinks 60 is welded to sidewalls 71, 72 to prevent material from dropping below the wear plate.

Figure 7:
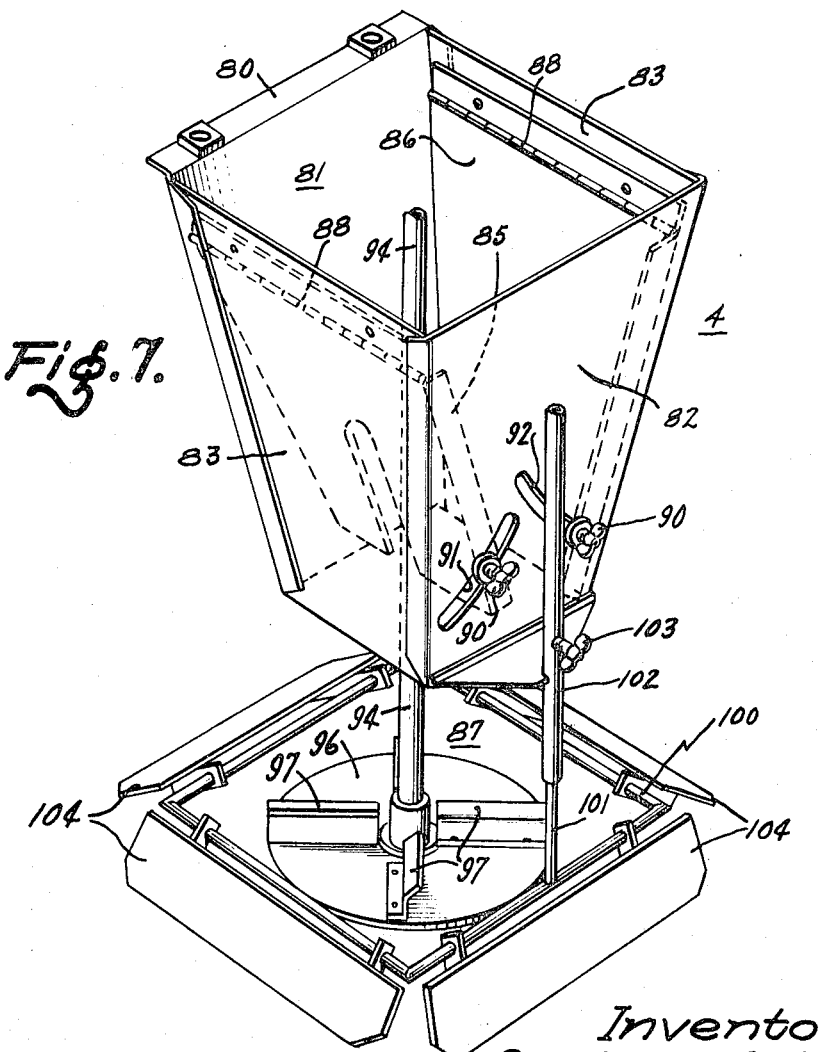
FIG. 7 is a perspective view of the chute and spinner assembly employed with our material-spreading apparatus.

We provide a material discharge chute and spinner assembly 4 (FIG. 7) which is connectable at the bottom of the outer end of either type of unitary conveyor assembly illustrated in FIGS. 5 and 6 by means of a flange 80. Flange 80 is at the upper end of rear wall 81 of the chute which has a front wall 82 and sidewalls 83 thus forming an opening positioned to receive material from the conveyor to which it is attached. Positioned within chute 81 are a pair of diverters 85, 86 hinged at their upper ends by piano hinges 88 so that they are adjustable in position to receive material and direct it to a spinner assembly 87 located below the bottom opening of the chute. The angular position of the diverters is adjustable by means of screws and wing nuts 90, which cooperate with arcuate openings 91, 92 in wall 82 to control both the spread density and pattern from a maximum on one side to a maximum on the other side. The spinner assembly 4 includes a vertical shaft 94 which is connected by means of a gearbox 95 (FIG. 5) and the previously described interconnecting drives to output shaft 44 of the power unit. Shaft 94 carries at its lower end a spinner disc 96 and a plurality of spinner vanes 97. We also provide an adjustable deflector assembly comprising a frame 100 supported by a rod 101 which passes through a supporting tube 102 attached to front wall 82 and is adjustable vertically by means of a thumb screw 103. Frame 100 carries a plurality of deflectors 104 which permit controlling the width and pattern of the material spread.

The palletized, cartridge-type power unit 3 is arranged to be supported on end wall 10 by means of bolts (not shown) to permit easy attachment and removal of the power unit from the spreading apparatus. Power unit 3 while being illustrated as a palletized-type of conventional gasoline engine may alternatively comprise a motor or any other suitable drive unit having an output shaft 44 which carries a pulley for connecting with pulley 42. We prefer to employ pulleys and V-belt drives for this particular connection between the power unit and the conveyor assembly. However, other types of well-known flexible drive connections may be employed. It is to be noted that power unit 3 is separate and distinct from unitary conveyor assembly 11, the sole connection between the two being V-belt 43. As a consequence, when it is desired to remove a conveyor assembly from the spreading apparatus it is necessary only to disconnect the V-belt drive and withdraw unitary conveyor assembly 11 from its supporting guides 12. When power unit 3 is a gasoline engine, it may be operated from the cab of the pickup truck or other motive unit by means of flexible connections (not shown) extending between the cab of the truck and the controls of the gasoline engine. Alternatively, when an electric motor is used as the power source, it is connected in a well-known manner by means of cables and suitable controls to the alternator or other electric power units of the pickup truck. It is understood, of course, that when a gasoline engine is employed as the power unit for the spreading apparatus, any suitable clutch with associated controls may be included between the gasoline engine and output shaft 44.

In the operation of our spreading apparatus, the conveyor assembly 11 included in the lower section 6 of the hopper is of the type best suited for the material to be spread. While we have shown and illustrated both an auger and drag-link-type of conveyor, any other suitable type of conveyor may be employed. The selected conveyor system slides easily into the lower section of the standard hopper and is quickly locked in operating position, thus permitting the use of a single type of hopper and a single power unit. The hopper is adjustable for use with the selected type of conveyor and the particular material, such as salt or sand, for example, which is to be spread.

If it becomes necessary to remove the conveyor assembly either because of injury to the spinner or the conveyor, or because it is desired to spread a different type of material, it is necessary only to remove the locking rod 50 which holds the conveyor assembly in position in lower section 6 and slide the unitary conveyor assembly rearwardly in guides 12. After this simple operation, a substitute or replacement conveyor assembly may be inserted rapidly and placed in operative position by reconnecting the drive belts 68 to the driven pulleys of the new conveyor assembly unit.

One of the advantages of our spreading apparatus is that when the spreading season is completed, the complete conveyor assembly can be quickly removed from the hopper to be cleaned and reconditioned for the next season.

A more important advantage of our improved spreader apparatus is that, since accidents frequently happen with the conveyor systems and breakdowns occur, the unitary conveyor assembly can be rapidly removed from the hopper and a replacement unit quickly and easily inserted to permit almost uninterrupted use of the hopper and pickup truck portion as well as the power unit of the spreading apparatus.

Still another advantage of our spreading apparatus is that the discharge chute and deflector frame, with its side deflectors and the spinner assembly, are connected directly to the conveyor assembly. As a consequence, when the unitary type conveyor assembly is removed, the essential spreading parts of the apparatus are likewise included in the unit and are ready for operation when a new unit is inserted.

While in the foregoing we have discussed accidents and disturbances which may occur in connection with the unitary conveyor assembly, it is well recognized that the drive unit itself sometimes requires servicing or becomes defective. As a consequence, our palletized power unit assembly which is easily removable and which is connected to the remaining operative portions of the spreader through only a drive belt connection, facilitates both replacement of the drive unit and maintenance of the unit in position.

In the foregoing description it is obvious that the material spreading apparatus constructed in accordance with our invention is particularly well adapted for use by reason of the convenience and facility with which it may be assembled and operated and the unitary material conveyor assembly may be inserted and replaced. It is also obvious that our invention can be changed and modified without departing from the principles and spirit thereof. For this reason, we do not wish to be understood as limiting ourselves to a precise arrangement, construction, or assembly of the parts shown and described above in carrying out our invention in practice, except as claimed.

We claim:

1. Self-feeding material-spreading apparatus comprising a hopper adapted to be carried on a truck or trailer and having a V-shaped upper section and a rectangular lower section connected to said upper section, a pair of end walls for said hopper, one of said end walls having an opening providing access to said lower section, a material conveyor assembly insertable through said opening to extend longitudinally of the truck or trailer which carries the hopper and removably positioned in said lower section, whereby any of a plurality of assemblies having different types of conveyors may be inserted to or withdrawn from an operative position below said V-shaped section, means for maintaining an inserted assembly in an operative position in said lower section, said assembly when in operative position having an end which extends through said opening to a point exterior to said one end wall, and material-spreading means attached to said end of said assembly for receiving material from the conveyor of said assembly.

2. The apparatus of claim 1 which includes power means mounted on said one end wall and power transmitting means connected between said power means and both said conveyor assembly and said material spreading means.

3. The apparatus of claim 1 in which said conveyor assembly includes a pair of sidewalls positionable between and in spaced relation with the sidewalls of said rectangular section, and a pair of deflector plates connected to said V-shaped upper section and extending into said rectangular lower section to direct material from said upper section into the conveyor assembly and prevent such material from entering the space between the sidewalls of the conveyor assembly and those of the lower section.

4. The apparatus of claim 3 in which the material-spreading means comprises a discharge chute connected to said end of said assembly at a point external to said one end wall of said hopper, a vertical shaft positioned in said chute, a rotatable disc connected to said shaft at the bottom of said chute, a plurality of vanes carried on said disc and an adjustable deflector mounted in said chute to direct material to be spread to said disc in a controllable pattern.

5. The apparatus of claim 3 in which the conveyor assembly includes an auger type conveyor and said assembly sidewalls are inclined to direct material to said auger conveyor.

6. The apparatus of claim 3 in which the conveyor assembly includes a drag bar type conveyor, said assembly having sidewalls which extend substantially vertically on opposite sides of the conveyor and include inclined flange portions for directing material to said drag-bar conveyor.

7. The apparatus of claim 6 in which the conveyor comprises a plurality of transverse bars, a drive chain connecting said bars, drive sprockets positioned at opposite ends of said conveyor and engaging said chain to cause said bars to travel in upper and lower paths, and a plate positioned between said paths to prevent material to be spread from reaching the lower path.

8. Material-spreading apparatus comprising a unitary hopper comprising:
an upper section having a pair of converging side members and a pair of end members connected to said side members;
a bottom section having a substantially planar bottom member and a pair of first sidewalls connected between said side members and said bottom member;
a pair of spaced guides supported on said bottom member;
a material conveyor assembly removably positioned in said guides in said bottom section, said conveyor assembly comprising a pair of second sidewalls defining a trough for receiving material to be spread and a material conveyor positioned in said trough;
material-spreading means mounted at one end of said trough;
one of said end members having an opening in its lower portion for inserting said conveyor assembly into said bottom section so that said first and second sidewalls are positioned in spaced substantially parallel relation;
means for locking said conveyor assembly in an operative position in said bottom section; and said side members including means extending into said trough for inhibiting material deposited in said hopper from entering the space between adjacent first and second sidewalls.

9. The assembly of claim 8 in which the conveyor is of the auger type.

10. The assembly of claim 8 in which the conveyor is of the drag-bar type.

11. Material-spreading apparatus comprising a unitary hopper comprising:
an upper section having a pair of converging side members and a pair of end members connected to said side members;
a bottom section having a substantially planar bottom member and a pair of first sidewalls connected between said side members and said bottom member;
a pair of spaced guides supported on said bottom member;
a material conveyor assembly removably positioned in said guides in said bottom section, said conveyor assembly comprising a pair of second sidewalls defining a trough for receiving material to be spread and a material conveyor positioned in said trough;
material-spreading means mounted at one end of said trough;
one of said end members having an opening in its lower portion for inserting said conveyor assembly into said bottom section so that said first and second sidewalls are positioned in spaced substantially parallel relation;
means for locking said conveyor assembly in an operative position in said bottom section; said side members including means extending into said trough for inhibiting material deposited in said hopper from entering the space between adjacent first and second sidewalls;
power means mounted on said end wall; and
means connecting said power means to said conveyor and said spreader.